(12) United States Patent
Ye et al.

(10) Patent No.: US 10,115,069 B2
(45) Date of Patent: Oct. 30, 2018

(54) AUTHENTICATING PARCEL CONSIGNEES WITH INDICIA DECODING DEVICES

(71) Applicant: Hand Held Products, Inc., Fort Mill, SC (US)

(72) Inventors: Guoling Ye, Jiangsu (CN); Wei Zhao, Jiangsu (CN); Jianrong Xu, Jiangsu (CN)

(73) Assignee: Hand Held Products, Inc., Fort Mill, SC (US)

( * ) Notice: Subject to any disclaimer, the term of this patent is extended or adjusted under 35 U.S.C. 154(b) by 900 days.

(21) Appl. No.: 13/974,374

(22) Filed: Aug. 23, 2013

(65) Prior Publication Data

US 2014/0067692 A1    Mar. 6, 2014

(30) Foreign Application Priority Data

Sep. 3, 2012 (CN) .......................... 2012 1 0320277

(51) Int. Cl.
G06Q 10/08 (2012.01)
(52) U.S. Cl.
CPC ............................... G06Q 10/0835 (2013.01)
(58) Field of Classification Search
CPC ..... H04L 63/04; G06Q 10/0835; G06Q 10/08
See application file for complete search history.

(56) References Cited

U.S. PATENT DOCUMENTS 6,834,807 B2    12/2004   Ehrhart et al.
7,152,786 B2 *  12/2006   Brundage .............. G06K 19/16
                                                    235/380

(Continued)

FOREIGN PATENT DOCUMENTS

CN    1641663 A    7/2005
CN    1961330 A    5/2007

(Continued)

OTHER PUBLICATIONS

Judge, P. Q. (2002). Security and protection architectures for large-scale content distribution (Order No. 3072325). Available from ProQuest Dissertations and Theses Professional. (305602282). Retrieved from https://dialog.proquest.com/professional/docview/305602282?accountid=161862.*

(Continued)

Primary Examiner — Daniel Vetter
Assistant Examiner — Scott M Tungate
(74) Attorney, Agent, or Firm — Additon, Higgins & Pendleton, P.A.

(57) ABSTRACT

In general, techniques are described for authenticating a parcel consignee. A device including an imaging module, processors, and an output module may implement the techniques. The imaging module images a first indicia of a parcel and a second indicia that is separate from the first parcel to obtain representations of the first and second indicia. The processors process the representations of the first and second indicia to determine a first key specified by the first indicia and a second key specified by the second indicia. The processors also determine whether the second key corresponds with the first key, and authenticate a consignee that provided the second indicia as an authorized recipient of the parcel based on the determination of whether the second key corresponds with the first key. The output module then indicates whether the one or more processors authenticate the consignee as the authorized recipient of the parcel.

17 Claims, 5 Drawing Sheets

(56) References Cited

U.S. PATENT DOCUMENTS

| | | | |
|---|---|---|---|
| 7,225,166 B2 | 5/2007 | Brookner et al. | |
| 7,293,712 B2 | 11/2007 | Wang | |
| 8,108,259 B2 | 1/2012 | Klingenberg et al. | |
| 8,444,048 B1 * | 5/2013 | Nidamarthi | G06K 19/06037 235/375 |
| 8,730,015 B2 | 5/2014 | Graf Von Reischach et al. | |
| 2002/0111914 A1 | 8/2002 | Terada et al. | |
| 2003/0118191 A1 | 6/2003 | Wang et al. | |
| 2003/0182238 A1 | 9/2003 | Brookner et al. | |
| 2005/0248148 A1 | 11/2005 | Schenck et al. | |
| 2007/0205595 A1 | 9/2007 | Schenck et al. | |
| 2007/0290042 A1 | 12/2007 | Schenck et al. | |
| 2010/0327054 A1 * | 12/2010 | Hammad | G06F 21/34 235/375 |
| 2012/0246077 A1 * | 9/2012 | Skaaksrud | G06Q 30/0615 705/50 |

FOREIGN PATENT DOCUMENTS

| | | |
|---|---|---|
| CN | 101751547 A | 6/2010 |
| CN | 101930557 A | 12/2010 |
| GB | 2455812 A | 6/2009 |
| GB | 2507399 A | 4/2014 |

OTHER PUBLICATIONS

Combined Search and Examination Report in GB1315402.6 (Published Apr. 30, 2014 as GB2507399A), dated Feb. 19, 2014, 6 pages.
Office Action in related Chinese Application No. 201210320277.3 dated Nov. 16, 2017, pp. 1-12 [now U.S. Pat. No. 7,152,786].
English-translation of Office Action in related Chinese Application No. 201210320277.3 dated Nov. 16, 2017, pp. 1-14.

* cited by examiner

AUTHENTICATING PARCEL CONSIGNEES WITH INDICIA DECODING DEVICES

CROSS-REFERENCE TO PRIORITY APPLICATION

The present application claims the benefit of Chinese Patent Application No. 201210320277.3 for Authenticating Parcel Consignees with Indicia Decoding Devices, filed Sep. 3, 2012, which is hereby incorporated by reference in its entirety.

TECHNICAL FIELD

The present invention relates in general to mobile computing devices such as indicia decoding devices configured for authenticating a parcel consignee.

BACKGROUND

Shipping labels are typically affixed to parcels to enable a carrier to deliver the parcel to the correct consignee. A shipping label usually includes a consignor information field, a consignee information field, and some machine-readable indicia, such as a bar code. The carrier typically includes the machine-readable indicia to facilitate routing and tracking of the parcel as it passes through the carrier network. During transit, the carrier network may scan the machine-readable indicia as the parcel passes through each node in the distribution network. The carrier may provide status updates to both the consignor and the consignee tracking the parcel as the parcel moves through the carrier network.

When delivering the parcel, the delivery person typically employs an indicia scanning device to scan the machine-readable indicia. The delivery person may then prompt the recipient of the package to sign for the parcel (often by requiring the recipient to provide a digital signature via the indicia scanning device) and thereby confirm receipt of the parcel. While carriers typically prefer that the recipient sign for the parcel, the carrier may not require a signature from the recipient of the parcel. Moreover, the carrier may not require that the consignee even be present and may deliver the parcel without interaction with the consignee or any other person at the consignee's premises.

Although the carrier may permit parcels to be delivered without interaction with the consignee, ideally carriers prefer that the consignee be present so that the carrier can confirm that the consignee is an authorized recipient of the parcel. Signatures may provide the carrier with proof of delivery, but signatures alone are often not sufficient to confirm that the recipient is the consignee identified by the shipping label (or, in other words, what may be referred to as an "authorized recipient"). Thus, some carriers may require that the recipient of the parcel provide a government issued identification document, e.g., a driver's license, so that the carrier may authenticate the recipient as an authorized recipient of the parcel and verify that the parcel was delivered to the consignee identified by the shipping label and not any other recipient. Yet, requiring such identification documents is time consuming, especially when a single delivery person is expected to deliver hundreds of, if not more, parcels on any given day.

SUMMARY

In general, techniques are described that enable consignee authentication without the need for a government issued identification document or any other form of cumbersome authentication. The techniques may be especially beneficial in large scale parcel distribution networks. The techniques may allow delivery persons in such distribution networks to correctly deliver a large number of parcels without the difficult and time consuming process of checking the government issued identification documents of each consignee to confirm that the recipient of the parcel is an authorized recipient. For example, the delivery process may be significantly impaired where some consignees may not possess a government issued identification document or may not have their identification with them when delivery is attempted, resulting in the time and expense of a second delivery attempt. Additionally, the delivery process may be delayed where the delivery person delivers a parcel to the wrong address.

The techniques described in this disclosure may provide a carrier with the ability to quickly and accurately authenticate a consignee when delivering a parcel by providing the consignee with indicia separate from the parcel having information that corresponds with information specified by the indicia affixed to the parcel. The delivery person may then utilize an indicia scanning device configured to perform various aspects of the techniques described in this disclosure to scan both the indicia affixed to the parcel and the indicia provided separately to the consignee. The indicia scanning device may then compare the information specified by each of these indicia and confirm that the consignee providing the indicia is an authorized recipient of the parcel. In this way, the techniques may provide a carrier with the ability to quickly and accurately authenticate a recipient of a parcel as an authorized recipient without requiring recipients to provide a government issued identification document.

In one example, a method comprises imaging, with a mobile computing device, a first indicia on a parcel and a second indicia that is separate from the parcel to obtain a representation of the first indicia and a representation of the second indicia and processing, with the mobile computing device, the representation of the first indicia and the representation of the second indicia to determine a first key specified by the first indicia and a second key specified by the second indicia. The method further comprises determining, with the mobile computing device, whether the second key corresponds with the first key, and authenticating a consignee that provided the second indicia as an authorized recipient of the parcel based on the determination of whether the second key corresponds with the first key.

In another example, a device comprises an imaging module configured to image a first indicia of a parcel and a second indicia that is separate from the first parcel to obtain a representation of the first indicia and a representation of the second indicia. The device also comprises one or more processors configured to process the representation of the first indicia and the representation of the second indicia to determine a first key specified by the first indicia and a second key specified by the second indicia, determine whether the second key corresponds with the first key, and authenticate a consignee that provided the second indicia as an authorized recipient of the parcel based on the determination of whether the second key corresponds with the first key. The device further comprises an output module configured to indicate whether the one or more processors authenticate the consignee as the authorized recipient of the parcel.

In another example, the disclosure is directed to a non-transient computer-readable storage medium comprising instructions that, when executed, cause one or more processors of a computing device to image a first indicia on a parcel and a second indicia that is separate from the parcel to obtain a representation of the first indicia and a representation of the second indicia, process the representation of the first indicia and the representation of the second indicia to determine a first key specified by the first indicia and a second key specified by the second indicia, determine whether the second key corresponds with the first key, and authenticate a consignee that provided the second indicia as an authorized recipient of the parcel based on the determination of whether the second key corresponds with the first key.

In another example, a method comprises printing, with a computing device, a first indicia for a parcel that includes a first key corresponding to a second key specified in a second indicia, generating, with the computing device, the second indicia for transmission to an authorized recipient of the parcel, wherein the first key specified by the first indicia and the second key specified by the second indicia are used to authenticate a recipient of a parcel as an authorized recipient of the parcel.

In another example, a label printing device comprises a printer configured to print a first indicia for a parcel that includes a first key corresponding to a second key specified in a second indicia, and one or more processors configured to generate a second indicia for transmission to an authorized recipient of the parcel, wherein the first key specified by the first indicia and the second key specified by the second indicia are used to authenticate a recipient of a parcel as an authorized recipient of the parcel.

In another example, a non-transient computer-readable storage medium comprises instructions that, when executed, cause one or more processors of a computing device to print a first indicia for a parcel that includes a first key corresponding to a second key specified in a second indicia, and generate the second indicia for transmission to an authorized recipient of the parcel, wherein the first key specified by the first indicia and the second key specified by the second indicia are used to authenticate a recipient of a parcel as an authorized recipient of the parcel.

In another example, an article comprises a first indicia specifying a first key corresponding to a second key specified by a second indicia, wherein the first key specified by the first indicia and the second key specified by the second indicia are used to authenticate a recipient of a parcel as an authorized recipient of the parcel.

The details of one or more embodiments of the techniques are set forth in the accompanying drawings and the description below. Other features, objects, and advantages of the techniques will be apparent from the description and drawings, and from the claims.

DETAILED DESCRIPTION

Figure 1:
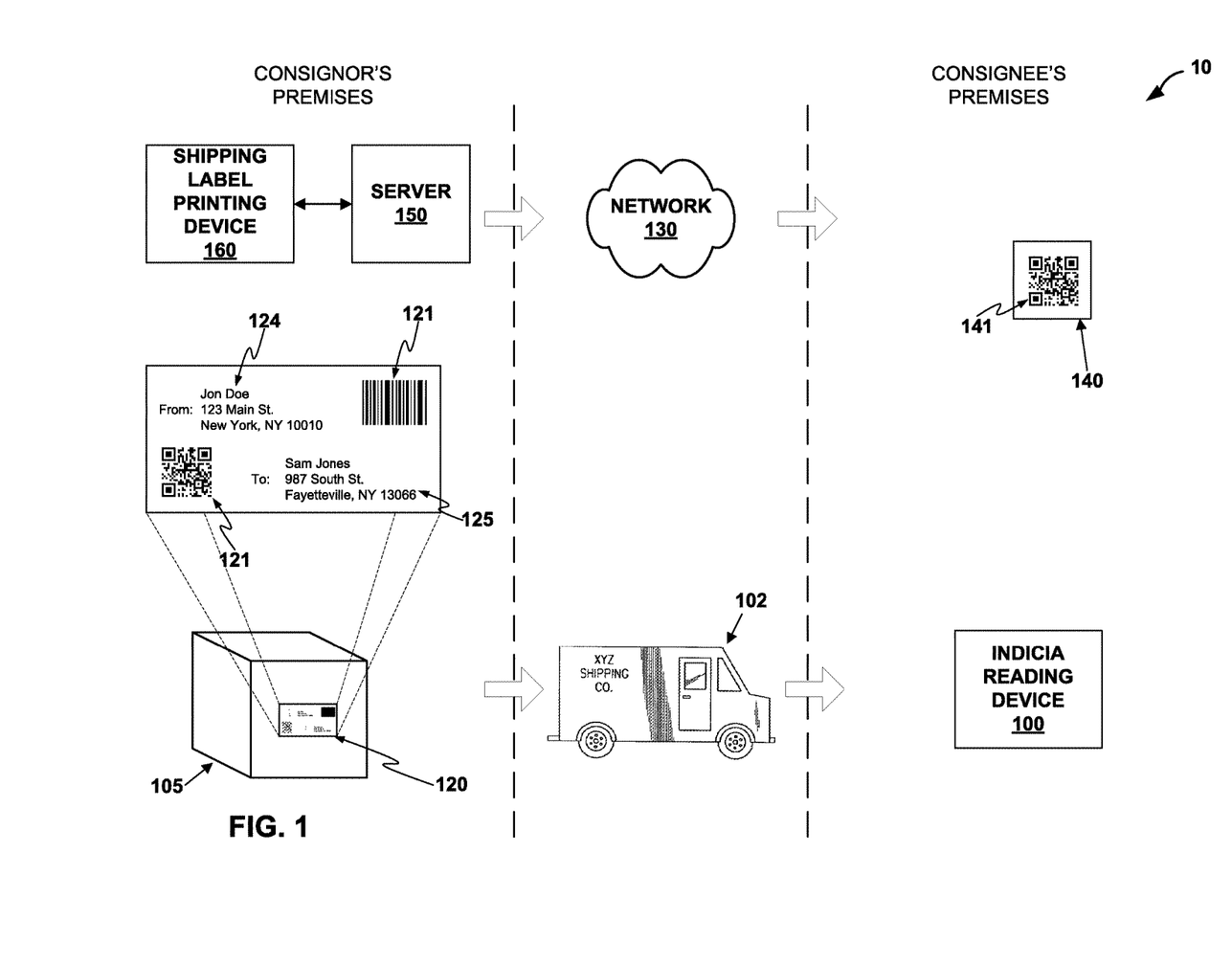
FIG. 1 is a diagram illustrating an example package transport or shipping system that performs various aspect of the parcel consignee authentication techniques described in this disclosure.

FIG. 1 is a diagram illustrating an example package transport or shipping system 10 that performs various aspect of the parcel consignee authentication techniques described in this disclosure. In the example of FIG. 1, the package transport or shipping system 10 includes a parcel 105, carrier network 102, network 130, indicia reading device 100, consignee identifier 140, server 150, and shipping label printing device 160.

Parcel 105 may be an envelope, a small package, a large package, a shipping pallet, a shipping container, a vehicle, and the like. Parcel 105 includes a shipping label 120, which shipping label printing device 160 may print, either on parcel 105 itself (e.g., printing directly to the box, label, envelope or other container described above) or to a separate piece of paper that can be affixed to parcel 105.

Shipping label printing device 160 represents a device that is configured to create shipping label 120. Shipping label printing device 160 may include a thermal printer, a laser printer, an ink jet printer, a ultra-violet printer, a solid ink printer, a dye-sublimation printer, or any other device capable of producing an image on a tangible medium, such as shipping label 120. Shipping label printing device 160 may be configured to encode information to a machine-readable indicia, such as encoding consignor information 124 and/or consignee information 125 into indicia 121. Shipping label printing device 160 may also be configured to connect to server 150 and/or network 130 to enable shipping label printing device 160 to communicate information about parcel 105, such as the creation of shipping label 120, which server 150 may then associate with a tracking number or other shipping related information.

The shipping label may include indicia 121, consignor information 124, and/or consignee information 125. Indicia 121 may be any machine-readable indicia such as a one-dimensional bar code, a two-dimensional bar code, and/or a set of stacked one-dimensional bar codes. Consignor information 124 may include the name, address, and/or other contact information for the consignor. Consignee information 125 may include the name, address, and/or other contact information associated with the consignee. Indicia 121 may be defined so as to specify consignor information 124 and/or consignee information 125.

Carrier network 102 is operable to transport parcel 105 from the consignor to the consignee. Carrier network 102, while shown as a single truck in the example of FIG. 1, may include any mode of transport by which parcels, such as parcel 105, is delivered from a consignor to a consignee. Thus, while not shown in the example of FIG. 1, carrier network 102 may include one or more nodes through which parcel 105 may pass between legs of a shipping route. Shipping label 120 may be read at one or more of the nodes of carrier network 102 to enable parcel 105 to be properly routed through carrier network 102. Shipping label 120 may be read automatically, such as to enable an automated distribution facility of carrier network 102 to route parcel 105. Carrier network 102 may be operable to track parcel 105 as parcel 105 travels from the consignor to the consignee. Carrier network 102 may be operatively connected to network 130 through which carrier network 102 may communicate with a server located in network 130 (but not shown in the example of FIG. 1 for ease of illustration purposes) to update the status of parcel 105 as parcel 105 travels through carrier network 102. These tracking updates may be communicated as status updates to the consignor and/or consignee, often via email or by updating a webpage associated with the tracking number.

Carrier network 102 may include one or more transportation modalities such as trucks, trains, aircraft, and/or watercraft. As noted above however, carrier network 102 may include any mode by which parcel 105 may be transported from the consignor to the consignee. Carrier network 102 may include a delivery person who may be tasked with delivering parcel 105 to the consignee. The delivery person may carry indicia reading device 100.

Indicia reading device 100 may image or scan indicia 121 to obtain a representation of indicia 121 and process the representation of indicia 121 to extract or otherwise obtain information from the representation of the first indicia and the representation of the second indicia of indicia 121. Indicia reading device 100 may, for example, process the representation of indicia 121 to extract consignor information 124, and/or consignee information 125 from the representation of indicia 121. Indicia reading device 100 may connect to network 130 to provide status updates about parcel 105 to the server of network 130, such as updating the server of network 130 to provide confirmation of delivery of parcel 105 to the consignee. Again, these updates may be provided to the consignor and/or consignee via email or by way of a website associated with the tracking number or other identifier assigned by the carrier network to identify parcel 105. While the techniques are described with respect to indicia reading device 100, the techniques of this disclosure may be implemented by any computing device capable of reading and comparing indicia. For example, indicia reading device 100 may be a mobile computing device such as a hand-held indicia decoder.

Carrier network 102 may include network 130, which represents a network owned and operated by the carrier that enables various aspects of carrier network 102 to coordinate and provide status regarding the delivery of parcels, such as parcels 105. Network 130 may include a packet switched network and may form part of a public network (such as the Internet), a private network, a cellular network or any combination of the foregoing. Network 130 may be accessible by the consignee, the consignor (e.g., via server 150 and/or shipping label printing device 160), and/or a delivery person (e.g., via indicia reading device 100).

When a consignor wishes to ship parcel 105, the consignor inputs shipment information such as consignor information and/or consignee information into shipping label printing device 160. Shipping label printing device 160 then encodes some or all of the shipment information into indicia 121 and prints shipping label 120 which is then attached to parcel 105. In some cases, the consignor provides the carrier with the shipment information and parcel 105, and the carrier creates shipment label 120. In this instance, carrier network 102 includes shipping label printing device 160 contrary to the example shown in FIG. 1. Thus, while described with respect to a particular arrangement of devices, networks and servers, the techniques may be performed with respect to other systems having varying arrangement of the devices, networks and servers shown in the example of FIG. 1.

In any event, the consignor may provide parcel 105 to carrier network 102 for shipment to the consignee. Carrier network 102 may route parcel 105 to a local distribution point proximate to consignee, where a delivery person may physically retrieve parcel 105 from this local distribution point and deliver parcel 105 to the consignee's premises (often by way of truck). To deliver parcel 105, the delivery person transports parcel 105 to the address indicated by consignee information 125 and/or indicia 121 and presents parcel 105 to a recipient that presumably resides at the identified address. The delivery person often employs indicia reading device 100 to read indicia 121 and interfaces with indicia reading device 100 to specify that parcel 105 has been delivered to the consignee address. In some instances, indicia reading device 100 may prompt the delivery person to obtain the signature of the recipient of parcel 105. The delivery person may then have the recipient provide a signature (which in some instances may be in the form of a digital signature captured via indicia reading device 100). In this way, the delivery person may then exchanges parcel 105 for the signature of the recipient.

While carriers typically prefer signatures from the consignee identified by shipping label 120, a signature may not be required in some instances. Moreover, the carrier may not require the consignee to even be present and may permit the delivery person to deliver parcel 105 without interaction with the consignee, e.g., by merely leaving parcel 105 at an identified location of the consignee's premises, or by interacting with a recipient that appears to reside at the consignee address but that is not the consignee identified by shipping label 120.

Although the carrier may permit parcels, such as parcel 105, to be delivered without interaction with the consignee or to recipients who are not the same as the consignee identified by shipping label 120, carriers may prefer that the recipient be the consignee identified by shipping label 120 so that the delivery person can confirm that the recipient is an authorized recipient of the parcel (meaning that the recipient is the same as the consignee identified by shipping label 120). Signatures may provide the delivery person with proof of delivery, but signatures alone are often not sufficient to confirm that the recipient is the consignee identified by shipping label 120. Thus, some carriers may require that the recipient of parcel 105 provide the delivery person with a government issued identification document, e.g., a driver's license, so that the delivery person may authenticate the recipient as an authorized recipient. Yet, requiring such identification documents is time consuming, especially when a single delivery person is expected to deliver hundreds of, if not more, parcels on any given day. Identification documents may not be readily available and a person with a name different than the consignee will not be able to receive the parcel even if authorized by the consignee.

In accordance with the consignee authentication techniques described in this disclosure, indicia reading device 100 allows for efficient consignee authentication by determining whether consignee identifier 140 includes indicia 141 specifying information that corresponds to information specified by indicia 121 of shipping label 120. Shipping label printing device 160 encodes some or all of the shipment information into indicia 121 and prints shipping label 120 which is then attached to parcel 105, as described above. Additionally, shipping label printing device 160 communicates some or all of the shipment information to server 150 which then transmits consignee identifier 140 to the consignee (in some instance). Server 150 may transmit consignee identifier 140 to the consignee via network 130. In some instances, shipping label printing device 160 prints consignee identifier 140, and the consignor sends this identifier 140 separate from parcel 105 to the consignee (meaning, that identifier 140 is sent via mail or other shipment routes separate from parcel 105).

Shipping label printing device 160 may generate indicia 121 and indicia 141 in such a manner that these indicia 121 and 141 each includes information that corresponds to each other and that may be used to authenticate a recipient as an authorized recipient. Shipping label printing device 160 may encrypt the information prior to encoding this information into one or both of indicia 121 and 141. In some instances, shipping label printing device 160 may encrypt information specified in indicia 121 and generate indicia 141 to specify a decryption key for decrypting the encrypted information specified by indicia 121. The encrypted information included in indicia 121 may be a timestamp which may correspond to the time the shipment was created and indicia 141 may include an identical timestamp. In some examples, the decryption key may be a randomly generated key. Encrypting this information in this manner may prevent recipients from attempting to forge consignee identifier 140 and thereby represent themselves as an authorized recipient using a forgery of consignee identifier 140.

As shown in FIG. 1, consignee identifier 140 may include indicia 141. Indicia 141 may be any machine-readable indicia such as a one-dimensional bar code, a two-dimensional bar code, and/or a set of stacked one-dimensional bar codes. Indicia 141 may include the same type of machine-readable indicia as indicia 121 and/or a different type of machine-readable indicia as indicia 121. Indicia 141 may include information corresponding to consignor information 124 and/or consignee information 125 of shipping label 120.

In operation, the delivery person may utilize indicia reading device 100 to scan both indicia 121 and indicia 141, which may image or scan indicia 141 to obtain a representation of indicia 141 and process the representation of indicia 141 to extract information from the representation of indicia 141. Indicia reading device 100 may, for example, process the representation of indicia 141 to extract the decryption key, the consignor information, and/or the consignee information from the representation of indicia 141. Additionally, indicia reading device 100 may image indicia 121 to obtain a representation of indicia 121 and process the representation of indicia 121 to extract information from the representation of indicia 121. Indicia reading device 100 may, for example, process the representation of indicia 121 to extract the encrypted information, consignor information 124, and/or consignee information 125 from the representation of indicia 121. Indicia reading device 100 may then decrypt the encrypted information using the decryption key to generate decrypted information, compare the decrypted information with information obtained from the representation of indicia 141, and determine whether the recipient providing consignee identifier 140 is an authorized recipient based on the comparison (e.g., when the decrypted information corresponds to the information obtained from the representation of indicia 141).

In this way, the techniques described in this disclosure may enable a delivery person to deliver a larger number of parcels in a shorter period of time while still ensuring that each parcel is delivered to the correct person at the correct address. Additionally, the techniques described in this disclosure may enable a consignor (such as, an online merchant) to ensure that a consignee (e.g., a customer of the online merchant) receives the correct parcel while simultaneously reducing the risk of loss of the parcel due to weather damage, theft, or similar circumstances which result in a parcel failing to properly reach a consignee.

Figure 2:
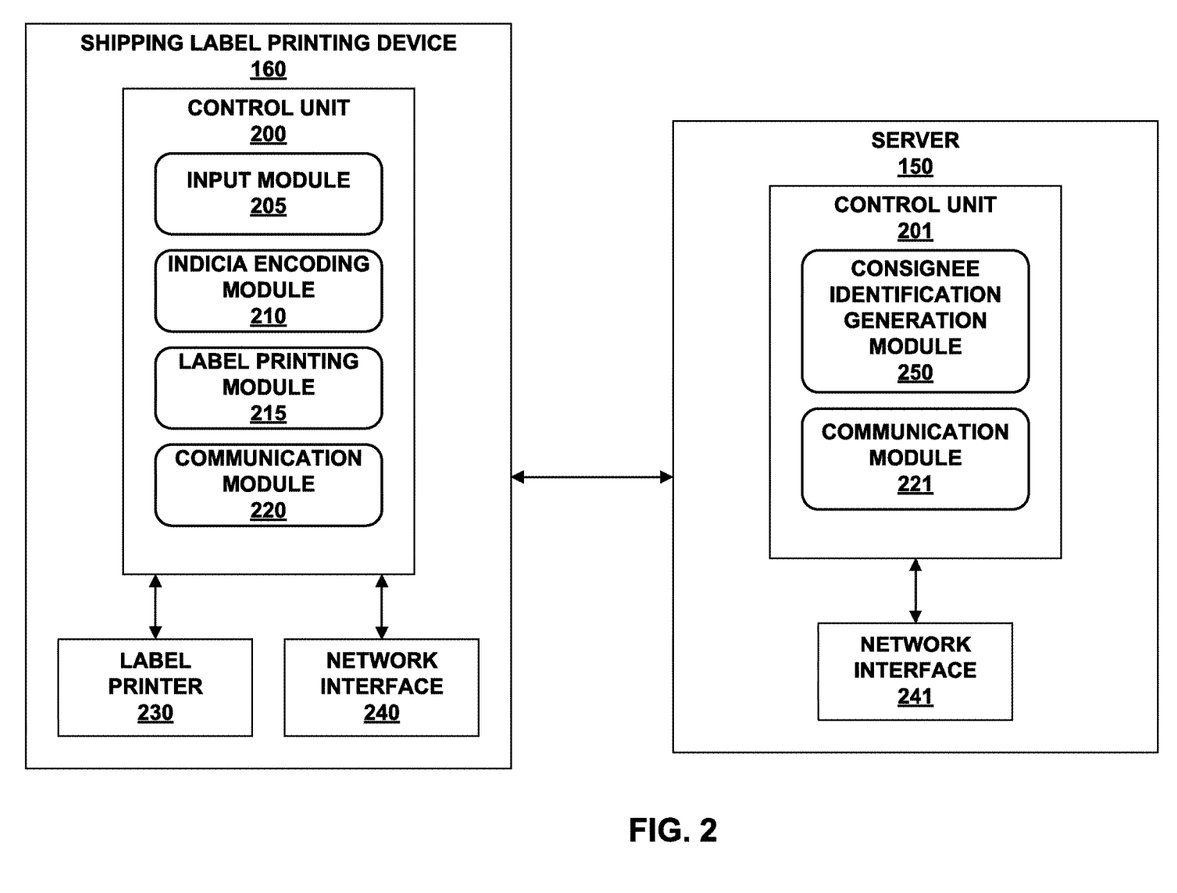
FIG. 2 is a block diagram illustrating the shipping label printing device and the server of FIG. 1 in more detail.

FIG. 2 is a block diagram illustrating shipping label printing device 160 and server 150 of FIG. 1 in more detail. FIG. 2 illustrates only one particular example of the shipping label printing device 160 and server 150, and other examples of the shipping label printing device 160 and server 150 may be used in other instances. For example, shipping label printing device 160 may include server 150 forming an integrated device. Moreover, the various aspects of the techniques described in this disclosure with respect to server 150 may be performed by any type of device and should not be limited to the specific device, i.e., server 150, shown in the example of FIGS. 1 and 2. To illustrate, a computing device may generally perform the operations described as being performed by server 150. Thus, while specific examples are shown in FIG. 2, the techniques may be performed by various other types of devices and should not be limited to the example of FIGS. 1 and 2.

As shown in the example of FIG. 2, the shipping label printing device 160 may include a control unit 200, a label printer 230, and a network interface 240. Control unit 200 may include an input module 205, an indicia encoding module 210, a label printing module 215, and a communication module 220. Control unit 200, label printer 230 and network interface 240 may be interconnected (physically, communicatively, and/or operatively). Server 150 may include control unit 201 and network interface 241. Control unit 201 may include consignee identification generation module 250 and communication module 221. Control unit 201 and network interface 241 may be interconnected (physically, communicatively, and/or operatively). Additionally, shipping label printing device 160 and server 150 may be interconnected (physically, communicatively, and/or operatively).

Control unit 200 represents a collection of hardware components, which in some instances executes software in the form of instructions stored to a computer readable medium (including a non-transitory computer-readable medium), to implement the techniques of this disclosure. For example, control unit 200 may comprise any combination of one or more of processors, Application Specific Integrated Circuits (ASICs), field programmable gate arrays (FPGAs), integrated circuits or any other processing or control element or combination thereof. In some instances, control unit 200 may include a memory or storage device (e.g., generally, a computer-readable storage medium), which may store the above described instruction that, when executed, cause the processor to perform the techniques described in this disclosure. These instructions may form a computer or software program or other executable module that the programmable processor executes to perform the functionality described herein, including the functionality attributed to the techniques of this disclosure.

Input module 205 of control unit 200 may represent a module configured to enable shipping label printing device 160 to receive shipment information. Control unit 200 may invoke input module 205 to receive shipment information from a physical user interface (not shown), such as a keyboard, or network interface 240. Input module 205 may be configured to send the shipment information to indicia encoding module 210. Input module 205 may process the shipment information to ensure the shipment information is specified, as one example, using a correct format.

Indicia encoding module 210 of control unit 200 may represent a module configured to encode the shipment information received by input module 205 into an indicia, such as indicia 121 shown in the example of FIG. 1. Indicia encoding module 210 may encode all or a subset of the shipment information into the indicia. Indicia encoding module 210 may be configured to encrypt a piece of information, which may be a timestamp, with a decryption key, which may be a random key. Indicia encoding module 210 may also encode information encrypted using the encryption key into the indicia. The indicia encoded by indicia encoding module 210 may be any machine-readable indicia such as a one-dimensional bar code, a two-dimensional bar code and/or a set of stacked one-dimensional bar codes. An example of a one-dimensional bar code is shown as one-dimensional bar code 121 in the example of FIG. 1, while an example of a two-dimensional bar code is shown as two-dimensional bar-code 121 in the example of FIG. 1. Indicia encoding module 210 may be configured to send the encoded indicia, the random key, and/or the shipment information to label printing module 215 and/or communication module 220.

Label printing module 215 of control unit 200 may represent a module configured to interface with label printer 230 to create a shipping label, such as shipping label 120 of FIG. 1. Label printing module 215 may interface with label printer 230 to create shipping label 120 by providing instructions to direct and/or control label printer 230. Label printing module 215 may be configured to format the shipment information and/or the indicia received from indicia encoding module 210 into a predetermined shipping label format, such as the format illustrated by shipping label 120 of FIG. 1. In some examples, label printing module 215 may encode the shipment information and/or the indicia into a format recognized by label printer 230, such as post script.

Label printer 230 may be configured to create a shipping label, such as shipping label 120 of FIG. 1. Label printer 230 may be configured to receive instructions from label printing module 215. Label printer 230 may include, along with supporting hardware and/or software, a thermal printer, a laser printer, an ink jet printer, an ultra-violet printer, a solid ink printer, a dye-sublimation printer, or any other device capable of producing an image on a tangible medium, such as shipping label 120. In some examples, label printer 230 may be configured to produce all or a subset of the shipment information and/or the indicia directly onto a parcel, such as parcel 105 of FIG. 1.

Communication module 220 may be configured to communicate with external devices, such as server 150, via network interface 240. Communication module 220 may transmit the shipment information, the decryption key, and/or the indicia encoded by indicia encoding module 210 to an external device, such as server 150 and/or consignee network 102 of FIG. 1.

Network interface 240 may, in some examples, be used by shipping label printing device to communicate with external devices (such as server 150) via one or more networks, such as the internet and/or network 130 of FIG. 1. Network interface 240 may be a network interface card, such as an Ethernet card, an optical transceiver, a radio frequency transceiver, or any other type of device that can send and receive information. Other examples of such network interfaces may include Bluetooth, 3G and Wi-Fi radios in mobile computing devices as well as USB.

Similar to control unit 200, as illustrated above, control unit 201 of server 150 represents a collection of hardware components, which in some instances executes software in the form of instructions stored to a computer readable medium (including a non-transitory computer-readable medium), to implement the techniques of this disclosure. These instructions may form a computer or software program or other executable module that the programmable processor executes to perform the functionality described herein, including the functionality attributed to the techniques of this disclosure.

Similar to network interface 240, as illustrated above, network interface 241 of server 150 may communicate with external devices (such as shipping label printing device 160) via one or more networks, such as the internet and/or network 130 of FIG. 1. Network interface 241 may be a network interface card, such as an Ethernet card, an optical transceiver, a radio frequency transceiver, or any other type of device that can send and receive information. Other examples of such network interfaces may include Bluetooth, 3G and Wi-Fi radios in mobile computing devices as well as USB.

Communication module 221 may be configured to communicate with external devices, such as shipping label printing device 160 and/or network 130 of FIG. 1, via network interface 241. In some examples, communication module 221 may receive information from shipping label printing device 160 such as shipment information, an indicia, a decryption key, and/or a formatted shipping label. Communication module 221 may transmit information, such as a consignee identifier generated by consignee identification generation module 250 to a consignee and/or a carrier network.

Consignee identification generation module 250 may be configured to generate a consignee identifier, such as consignee identifier 140 of FIG. 1. Consignee identification generation module 250 may generate the consignee identifier with information received from communication module 221, such as shipment information, a decryption key, and/or an indicia.

To create a shipping label, shipping label printing device 160 may receive shipment information via input module 205 and invoke indicia encoding module 210 to encode an indicia, such as indicia 121 of shipping label 120. In some cases, indicia encoding module 210 may encrypt information based on an encryption key, where this encrypted information is then stored or represented by the indicia when encoded. Then, label printing module 215 may format the shipment information along with the indicia and interface with label printer 230 to produce shipping label 120 on a tangible medium. The consignee then attaches shipping label 120 to parcel 105 which is then transported for delivery to the consignee in accordance with the consignee authentication techniques disclosed herein.

At some point before parcel 105 is delivered to the consignee, communication module 220 transmits the shipment information, indicia 121, and/or the formatted shipping label to server 150. In some cases, communication module 220 may transmit the key used to encrypt the information encoded into indicia 121 to server 150, which then creates consignee identifier 140. In some cases, communication module 220 may transmit any or all of the information to carrier network 102 shown in the example of FIG. 1.

To create a consignee identifier, server 150 may format the shipment information, the indicia, and/or other additional information into a format capable of being transmitted to the consignee, such as an e-mail or a webpage. Server 150 may then transmit the generated consignee identifier to the consignee, such as by sending the e-mail including the consignee identifier and/or posting the consignee identifier on a webpage accessible by the consignee. In some cases, the e-mail including the consignee identifier may be sent via network 130 shown in the example of FIG. 1.

In this way, shipping label printing device 160 may print shipping label 120 that includes indicia 121. This indicia 121 may specify information (such as a timestamp) corresponding to information (such as the timestamp) specified by indicia 141, which, upon comparing the information specified by indicia 121 and 141, may enable authentication of a recipient as an authorized recipient. Be enabling shipping label printing device 160 to print indicia in this manner, the techniques may provide for a more convenient and efficient way by which to authenticate a recipient as an authorized recipient without requiring the recipient to provide photo identification.

While the techniques are described with respect to shipping label printing device 160 and server 150, the techniques of this disclosure may be implemented by any computing device capable of producing a shipping label and transmitting a corresponding document to the consignee. For example, shipping label printing device 160 and server 150 may be the same device. Additionally, while described as separate modules, any or all of the modules of shipping label printing device 160 and/or server 150 may be implemented in a single module or any combination of modules.

Figure 3:
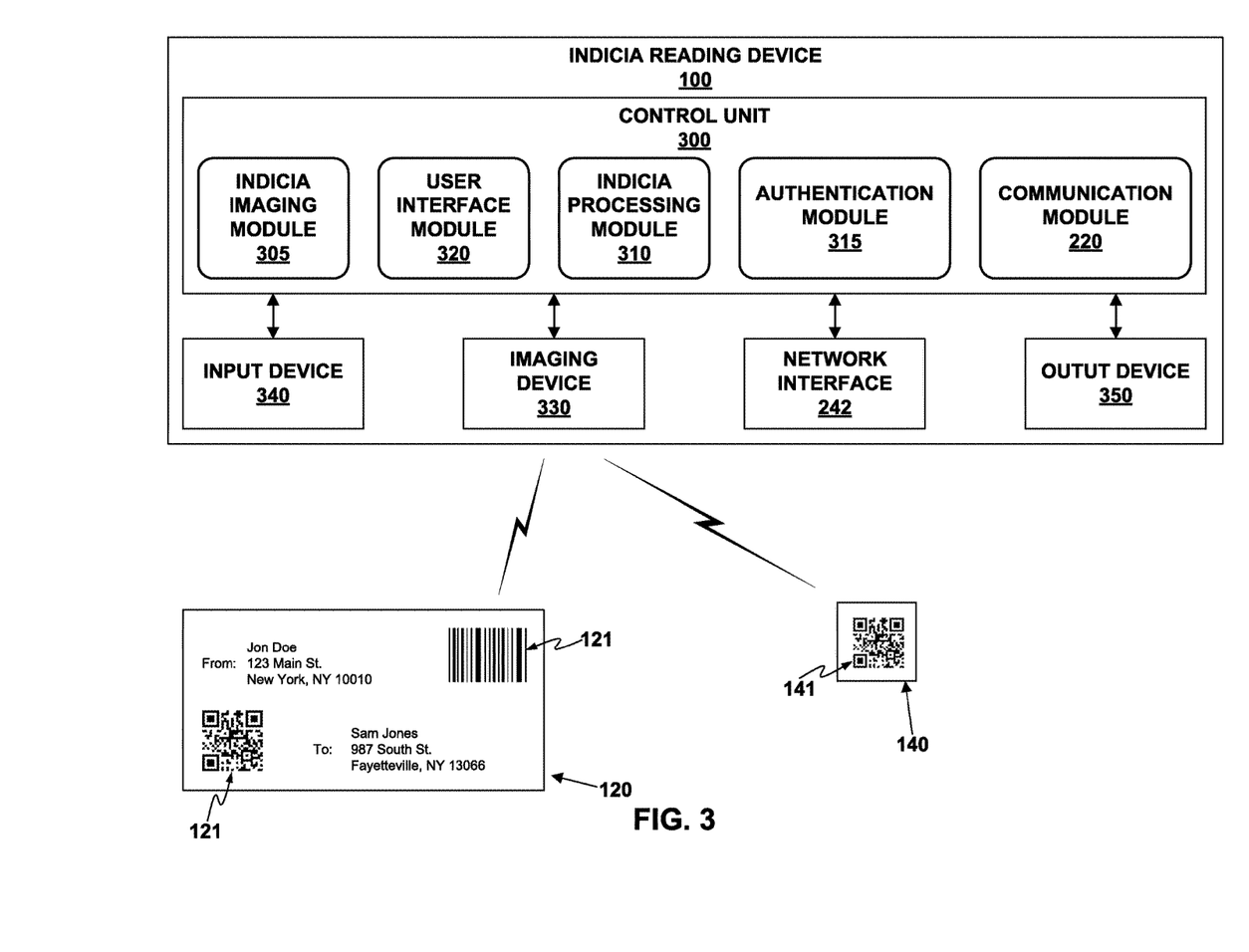
FIG. 3 is a block diagram illustrating indicia reading device of FIG. 1 in more detail.

FIG. 3 is a block diagram illustrating indicia reading device 100 of FIG. 1 in more detail. FIG. 3 illustrates only one particular example of indicia reading device 100, and other examples of indicia reading device 100 may be used in other instances. Moreover, the various aspects of the techniques described in this disclosure with respect to indicia reading device 100 may be performed by any type of device and should not be limited to the specific device, i.e., indicia reading device 100, as shown in the example of FIGS. 1 and 3. To illustrate, a computing device may generally perform the operations described as being performed by indicia reading device 100. Thus, while specific examples are shown in FIG. 3, the techniques may be performed by various other types of devices and should not be limited to the example of FIGS. 1 and 3.

As shown in the example of FIG. 3, the indicia reading device 300 may include a control unit 300, an imaging device 330, an input device 340, an output device 350, and a network interface 242. Control unit 300 may include an indicia imaging module 305, an indicia processing module 310, an authentication module 315, a user interface module 320, and communication module 220. Control unit 300, imaging device 330, input device 340, output device 350, and network interface 242 may be interconnected (physically, communicatively, and/or operatively).

As stated above with reference to the example of FIG. 2, control unit 300 represents a collection of hardware components, which in some instances executes software in the form of instructions stored to a computer readable medium (including a non-transitory computer-readable medium), to implement the techniques of this disclosure. For example, control unit 300 may comprise any combination of one or more of processors, Application Specific Integrated Circuits (ASICs), field programmable gate arrays (FPGAs), integrated circuits or any other processing or control element or combination thereof. In some instances, control unit 300 may include a memory or storage device (e.g., generally, a computer-readable storage medium), which may store the above described instruction that, when executed, cause the processor to perform the techniques described in this disclosure. These instructions may form a computer or software program or other executable module that the programmable processor executes to perform the functionality described herein, including the functionality attributed to the techniques of this disclosure.

Indicia imaging module 305 of control unit 300 may represent a module configured to interface with imaging device 330 to capture a representation of a machine-readable indicia, such as indicia 121 and/or indicia 141. Indicia imaging module 305 may interface with imaging device 330 to capture the representation of indicia 121 and/or 141 by providing instructions to direct and/or control imaging device 330. Indicia imaging module 305 may be configured to receive the representation of indicia 121 and/or 141 captured by imaging device 330. Indicia imaging module 305 may be configured to send the received representation of indicia 121 and/or 141 to indicia processing module 310. In some examples, indicia imaging module 305 may modify the received representation prior to sending the representation to indicia processing module 310.

Imaging device 330 may be configured to capture a representation of a machine-readable indicia, such as indicia 121 and/or indicia 141. Imaging device 330 may be configured to receive instructions from indicia imaging module 305. Imaging device 330 may include a machine-readable indicia scanner, such as a laser scanner or a pen-type reader, an electronic image sensor, such as a charge-coupled device (CCD) or complementary metal-oxide-semiconductor (CMOS) image sensor, and/or any other electronic sensor capable of obtaining a representation of a machine-readable indicia, such as indicia 121 and/or indicia 141. For example, imaging device 330 may scan indicia 121 of shipping label 120 and indicia 141 of consignee identifier 140 to capture a representation of indicia 121 and indicia 141. Imaging device 330 may be configured to send the obtained representations to indicia imaging module 305 and/or indicia processing module 310.

Indicia processing module 310 of control unit 300 may represent a module configured to receive the representation of the first indicia and the representation of the second indicia from indicia imaging module 305. Indicia processing module 310 may be configured to process the representation of the first indicia and the representation of the second indicia to determine a first key specified by the first indicia and a second key specified by the second indicia. In some examples, indicia processing module 310 may be configured to use all or a portion of one of the keys to decrypt all or a portion of the other key, such as using a portion of the second key to decrypt a portion of the first key.

Authentication module 315 of control unit 300 may represent a module configured to authenticate the first key received from indicia processing module 310 with the second key received from indicia processing module 310. Authentication module 315 may compare the first key and the second key to determine whether the second key corresponds with the first key. In some examples, authentication module 315 may be configured to compare all or a portion of the first key with all or a portion of the second key. Authentication module 315 may determine that the second key corresponds to the first key where the first key is identical to the second key or where a portion of the first key is identical to a portion of the second key. Authentication module 315 may be configured to send the results (i.e., whether the second key corresponds to the first key) to user interface module 320. In some examples, authentication module 315 may create a report including the authentication result. The report may include the first key, the portion of the first key, the second key, the portion of the second key, the date and time, or any combination thereof. In some examples, authentication module 315 transmits the report to a remote computing device via output device 350.

User interface module 320 of control unit 300 may represent a module configured to allow a user, such as a delivery person, to interact with indicia reading device 100.

Control unit 300 may invoke user interface module 320 to receive user input via input device 340 and/or provide user output via output device 350. In some examples, user interface module 320 may be configured to invoke one or more of the modules within control unit 300 in response to a user input, such as a user input received by input device 340.

Input device 340 may be configured to receive user input. Input device 340 may be configured to send received user input to user interface module 320. Input device 340 may include a touch screen which may include one or more virtual buttons, a trigger switch, a gyroscope, a joystick, and/or one or more physical buttons which may be in a keyboard layout and/or standalone.

Output device 350 may be configured to provide user output. Output device 350 may be configured to receive instructions from user interface module 320. Output device 350 may include a visual output device (e.g., an electronic display), an audio output device (e.g., a speaker), or a tactile output device (e.g., a vibration device). In some examples, output device 350 may share hardware with input device 340, such in examples where input device 340 and output device 350 include a touchscreen.

Similar to network interface 241 of the example illustrated in FIG. 2, network interface 242 of indicia reading device 100 may communicate with external devices (such as carrier network 102 and/or server 150) via one or more networks, such as the internet and/or network 130 as shown in the example of FIG. 1. Network interface 242 may be a network interface card, such as an Ethernet card, an optical transceiver, a radio frequency transceiver, or any other type of device that can send and receive information. Other examples of such network interfaces may include Bluetooth, 3G and Wi-Fi radios in mobile computing devices as well as USB. In some examples, network interface 242 may be included within a device different from indicia reading device 100, such as a cradle or docking station configured to connect with and exchange data with indicia reading device 100.

Communication module 220 may be configured to communicate with external devices, such as carrier network 102, server 150, and/or network 130 as shown in the example of FIG. 1, via network interface 242. In some examples, communication module 220 may receive information from another module included in control unit 300, such as receiving a determination of whether a recipient is an authorized recipient from authentication module 315. Communication module 220 may transmit information, such as a report including the information received from authentication module 315 to an external device, such as carrier network 102, server 150, and/or network 130 as shown in the example of FIG. 1, via network interface 242.

To authenticate a recipient as an authorized recipient when delivering a parcel, such as parcel 105 as shown in the example of FIG. 1, a delivery person may provide an input to input device 340 to indicate that a parcel is to be delivered. In response to this input, user interface module 320 may then prompt the delivery person to scan indicia 121 of shipping label 120. The delivery person may then interface with indicia reading device 100 via input device 340 to provide an input that invokes indicia imaging module 305, which in turn interfaces with imaging device 330 to capture or otherwise obtain a representation of indicia 121 of shipping label 120.

After imaging indicia 121, user interface module 320 may prompt the delivery person to scan or otherwise image indicia 141 of consignee identifier 140. The delivery person may then interface with indicia reading device 100 via input device 340 to provide an input that invokes indicia imaging module 305, which in turn interfaces with imaging device 330 to capture or otherwise obtain a representation of indicia 141 of consignee identifier 140. In some instances, indicia imaging module 305 may then perform some form of image or other processing of the representation of indicia 121 and/or the representation of indicia 141 to correct for lighting or other issues.

Indicia imaging module 305 may then send the representation of indicia 121 and the representation of indicia 141 to indicia processing module 310. Indicia processing module 310 may then process the representation of indicia 121 and the representation of indicia 141 to determine a first key specified by indicia 121 and a second key specified by indicia 141. In some cases, indicia processing module 310 may decrypt all or a portion of the first key with all or a portion of the second key. Indicia processing module may then send the first key and the second key to authentication module 315.

Authentication module 315 may then compare the first key processed from the representation of indicia 121 to the second key processed from the representation of indicia 141 to determine whether the second key corresponds with the first key. In some cases, authentication module 315 may compare all or a portion of the first key with all or a portion of the second key. Authentication module 315 may determine that the second key corresponds with the first key where the second key is identical to the first key. In some cases, authentication module 315 may determine that the second key corresponds with the first key where a portion of the first key is identical to a portion of the second key. Where authentication module 315 determines that the second key corresponds with the first key, authentication module 315 may determine that the recipient who provided consignee identifier 140 is an authorized recipient. Authentication module 315 may then send the result of comparing the first key with the second key (i.e., whether the recipient is the authorized recipient) to user interface module 320 and/or communication module 220.

User interface module 320 may then send instructions to output device 350 which cause output device 350 to produce an output indicating whether the recipient is the authorized recipient. In some cases, communication module 220 may then send a report, via network interface 242, including the result of determining whether the recipient is the authorized recipient to an external device such as carrier network 102, server 150, and/or network 130 of FIG. 1. In some cases, such as where network interface 242 is separable from indicia reading device 100, communication module 220 may refrain from transmitting the report until indicia reading device 100 is connected to network interface 242.

While the techniques are described with respect to indicia reading device 100, the techniques of this disclosure may be implemented by any computing device capable of comparing a first indicia with a second indicia. Additionally, while described as separate modules, any or all of the modules of indicia reading device 100 may be implemented in a single module of any combination of modules.

Figure 4:
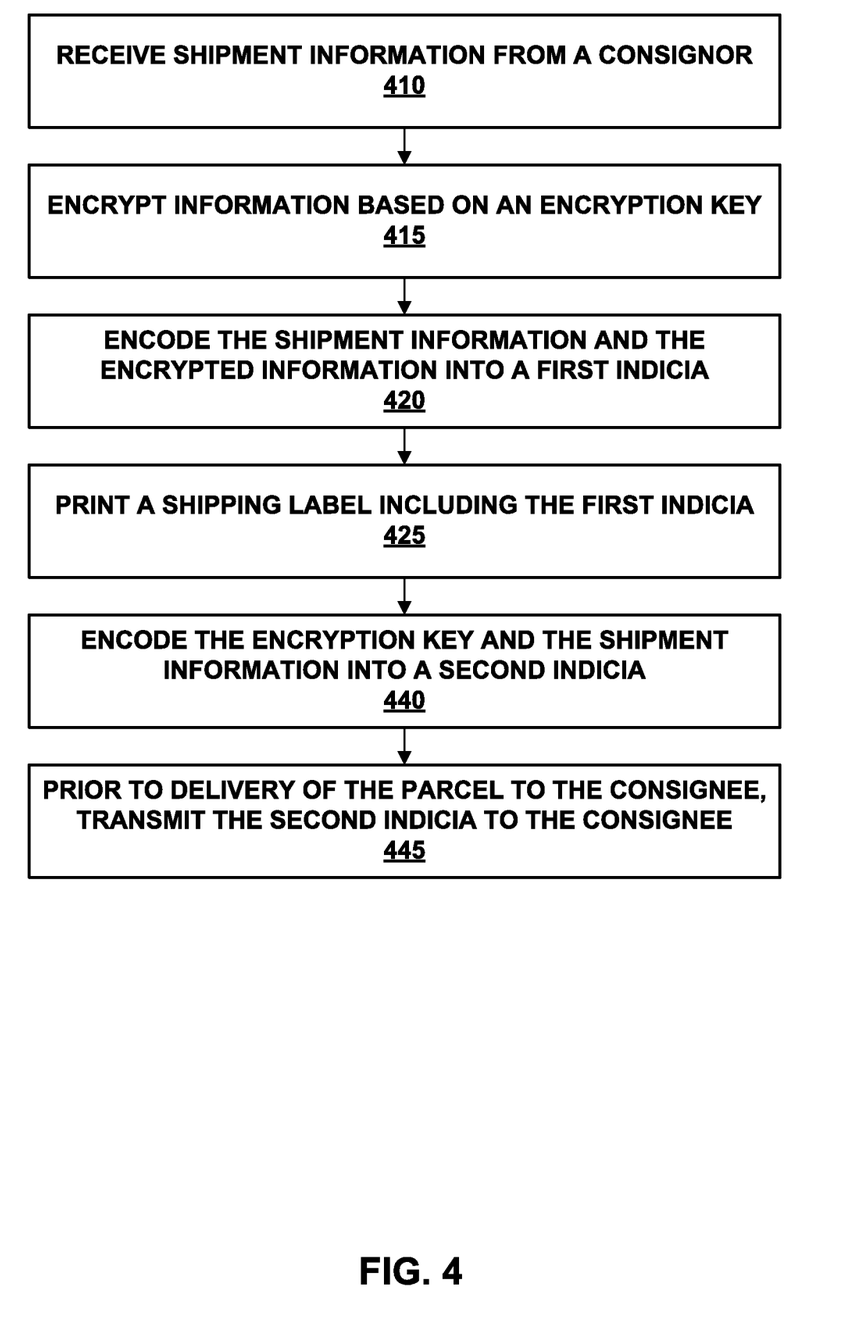
FIG. 4 is a flowchart illustrating an example operation of a shipping label printing system in performing one or more aspects of the techniques described in this disclosure.

FIG. 4 is a flowchart illustrating an example operation of a shipping label printing system, such as shipping label printing device 160, in performing one or more aspects of the techniques described in this disclosure. While described with respect to a particular system, i.e., shipping label printing device 160 in the examples of FIGS. 1-3, the techniques may be performed by any type of device capable of printing labels for delivery of parcels and other items.

Initially, control unit 200 of shipping label printing device 160 may receive shipment information from a consignor via input module 205 (410). In some instances, as noted above, control unit 200 may invoke indicia encoding module 210 to encrypt the received information using an encryption key prior to encoding the information as an indicia, such as indicia 121 of shipping label 120 (415). In any event, indicia encoding module 210 then encodes the encrypted information as indicia 121 of shipping label 120 (420). Control unit 200 may then invoke label printing module 215, which interfaces with label printer 230 to print shipping label 120 including indicia 121 (425). This shipping label 120, if not printed directly on parcel 105, may then be attached to parcel 105 and parcel 105 may be transferred to a carrier network for delivery to the consignee.

Indicia encoding module 210 of shipping label printing device 160 may also encode the encryption key and the shipment information into indicia 141, and, prior to delivering the parcel to the consignee, transmitting indicia 141 to the consignee in the form of consignee identifier 140 (440, 445). In some examples, indicia encoding module 210 may interface with consignee identification generation module 250 executed by control unit 201 of server 150 to provide consignee identification generation module 250 with indicia 141. Consignee identification generation module 250 may then generate consignee identifier 140 to include indicia 141 and transmit this consignee identifier 140 to the consignee (often in digital form, such as by way of email or webpage).

Figure 5:
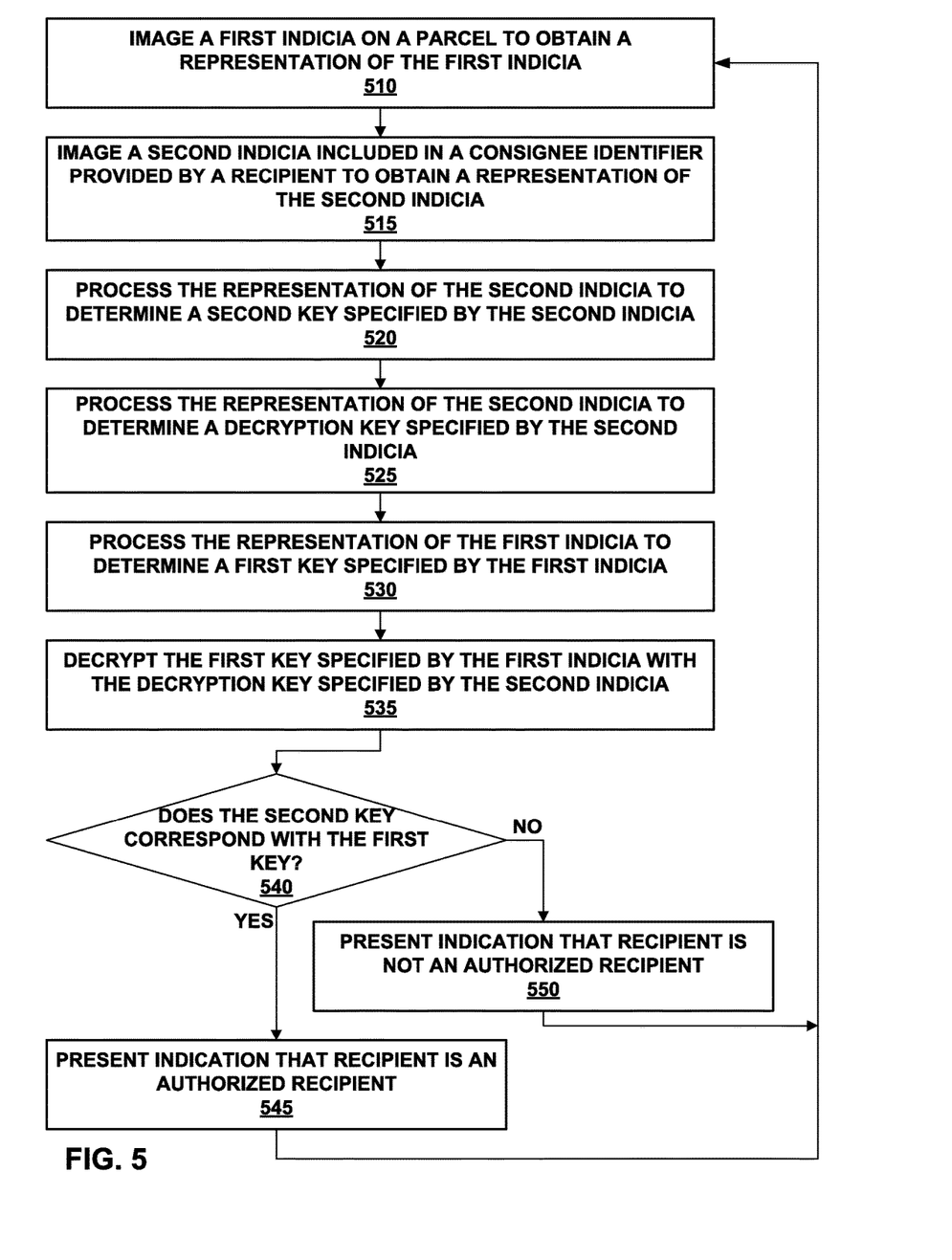
FIG. 5 is a flowchart illustrating an example operation of a computing device in authenticating a parcel consignee in accordance with one or more aspects of the present disclosure.

FIG. 5 is a flowchart illustrating an example operation of a computing device, such as indicia reading device 100 shown in the example of FIG. 1, in authenticating a parcel consignee in accordance with one or more aspects of the present disclosure. While described in this disclosure with respect to a particular device, i.e., indicia reading device 100, the techniques may be performed by any computing device capable of scanning or imaging an indicia.

Control unit 300 of indicia reading device 100 may, as described above, invoke indicia imaging module 305, which interfaces with imaging device 330 to image a first indicia (e.g., indicia 121) on parcel 105 and a second indicia (e.g., indicia 141) included in consignee identifier 140 that is separate from the parcel to obtain a representation of the first indicia and a representation of the second indicia (510, 515). Control unit 300 may then invoke indicia processing module 310 to process the representation of indicia 121 and the representation of indicia 141 to determine a first key specified by indicia 121 and a second key specified by indicia 141 (520, 530), also as described above. Indicia processing module 310 may further process the representation of indicia 141 to determine a decryption key specified by indicia 141 (525), also as described above. Additionally, indicia processing module 310 may then decrypt the first key specified by indicia 121 with the decryption key specified by the indicia 141 (535), also as described above.

As further described above, control unit 300 may then invoke authentication module 315, which determines whether the second key corresponds with the first key (540). If the second key corresponds with the first key ("YES" 540), authentication module 315 may then determine that the recipient providing indicia 141 is an authorized recipient of the parcel and interface with output device 350 to present an indication to the delivery person that the recipient is an authorized recipient (545). If the second key does not correspond with the first key ("NO" 540), authentication module 315 may then determine that the recipient providing indicia 141 is not an authorized recipient of the parcel and interface with output device 350 to present an indication to the delivery person that the recipient is not an authorized recipient (550).

While the present techniques have been described with reference to a number of specific embodiments, it will be understood that the scope of the techniques is not limited to any particular embodiments or combination of embodiments or elements discussed above or depicted in the figures. Further, while in numerous cases herein wherein devices, systems, apparatuses, or methods are described as having a certain number of elements, it will be understood that such devices, systems, apparatuses, or methods can be practiced with fewer than or greater than the illustratively indicated certain number of elements. For example, where any claimed embodiment may recite a feature or at least one feature, that embodiment may also comprise more than one of that feature. Also, while a number of particular embodiments have been described, it will be understood that features and aspects that have been described with reference to each particular embodiment can be used in any combination with features and aspects of any other embodiment.

The invention claimed is:

1. A method, comprising:
encoding a first key into a first indicia, wherein the first key is encrypted;
encoding a second key and a decryption key into a second indicia, wherein the decryption key decrypts the first key;
generating, via a printer, a parcel label including an image of the first indicia and a name of a consignee for a parcel bearing the parcel label;
imaging, with a mobile computing device, the first indicia on the parcel to obtain a representation of the first indicia;
imaging, with the mobile computing device, the second indicia provided by a recipient of the parcel to obtain a representation of the second indicia;
processing, with the mobile computing device, the representation of the first indicia and the representation of the second indicia to determine the first key specified by the first indicia, and the second key and the decryption key specified by the second indicia;
after decrypting the first key, determining, with the mobile computing device, whether the second key matches the decrypted first key by comparing the second key with the decrypted first key; and
if the second key matches the first key, generating an indication with the mobile computing device that the recipient is an authorized recipient of the parcel.

2. The method of claim 1, wherein the decryption key is a random key.

3. The method of claim 1, comprising transmitting, prior to the parcel being delivered, the second indicia to an authorized recipient of the parcel.

4. The method of claim 1, comprising generating, on the mobile computing device, a report including a result from determining whether the second key matches the decrypted first key.

5. The method of claim 4, comprising transmitting, with the mobile computing device, the report to a remote computing device.

6. The method of claim 1, wherein the mobile computing device is a hand-held computing device.

7. A system, comprising:
a printer for generating a parcel label, the parcel label including an image of a first indicia and a name of a consignee for a parcel bearing the parcel label, wherein a first key is encoded into the first indicia and wherein the first key is encrypted; and a mobile device, the mobile device comprising:

an output device;

an imaging device for imaging the first indicia on the parcel and a second indicia provided by a recipient of the parcel, and obtaining a representation of the first indicia and a representation of the second indicia, wherein a second key and a decryption key for the first key is encoded into the second indicia; and one or more processors configured for:

processing the representation of the first indicia to determine the first key;

processing the representation of the second indicia to determine the second key and the decryption key for the first key;

determining, after decrypting the first key, whether the second key matches the decrypted first key; and if the second key matches the decrypted first key, generating an indication via the output device that the recipient is an authorized recipient of the parcel.

8. The system of claim 7, wherein the one or more processors are configured for generating a report including a result determining whether the second key matches the decrypted first key.

9. The system of claim 7, wherein the imaging device is configured for imaging and obtaining representations of one-dimensional bar codes and two-dimensional bar codes.

10. The system of claim 7, wherein the first key and the second key are identical.

11. The system of claim 7, wherein the mobile device is a mobile indicia reading device.

12. A method, comprising:

encoding a first key into a first indicia, wherein the first key is encrypted;

encoding a second key and a decryption key into a second indicia, wherein the decryption key decrypts the first key;

generating, via a printer, a parcel label including an image of the first indicia and a name of a consignee for a parcel bearing the parcel label;

imaging, with a mobile computing device, the first indicia on the parcel to obtain a representation of the first indicia;

imaging, with the mobile computing device, the second indicia provided by a recipient of the parcel to obtain a representation of the second indicia;

processing, with the mobile computing device, the representation of the first indicia and the representation of the second indicia to determine the first key specified by the first indicia, and the second key and the decryption key specified by the second indicia;

determining, with the mobile computing device, whether the second key matches a decrypted first key;

if the second key matches the decrypted first key, generating an indication with the mobile computing device that the recipient is an authorized recipient of the parcel; and transmitting, prior to the parcel being delivered, the second indicia to an authorized recipient of the parcel.

13. The method of claim 12, wherein determining whether the second key corresponds with the first key comprises: decrypting, with the mobile computing device, the first key with the decryption key of the second indicia; and determining, with the mobile computing device, whether the decrypted first key corresponds with the second key.

14. The method of claim 12, wherein the decryption key is a random key.

15. The method of claim 12, comprising generating, on the mobile computing device, a report including a result from determining whether the second key corresponds with the first key.

16. The method of claim 15, comprising transmitting, with the mobile computing device, the report to a remote computing device.

17. The method of claim 12, wherein the first key comprises a timestamp corresponding to a time that a shipment for the parcel was generated.

* * * * *